United States Patent Office 3,326,724
Patented June 20, 1967

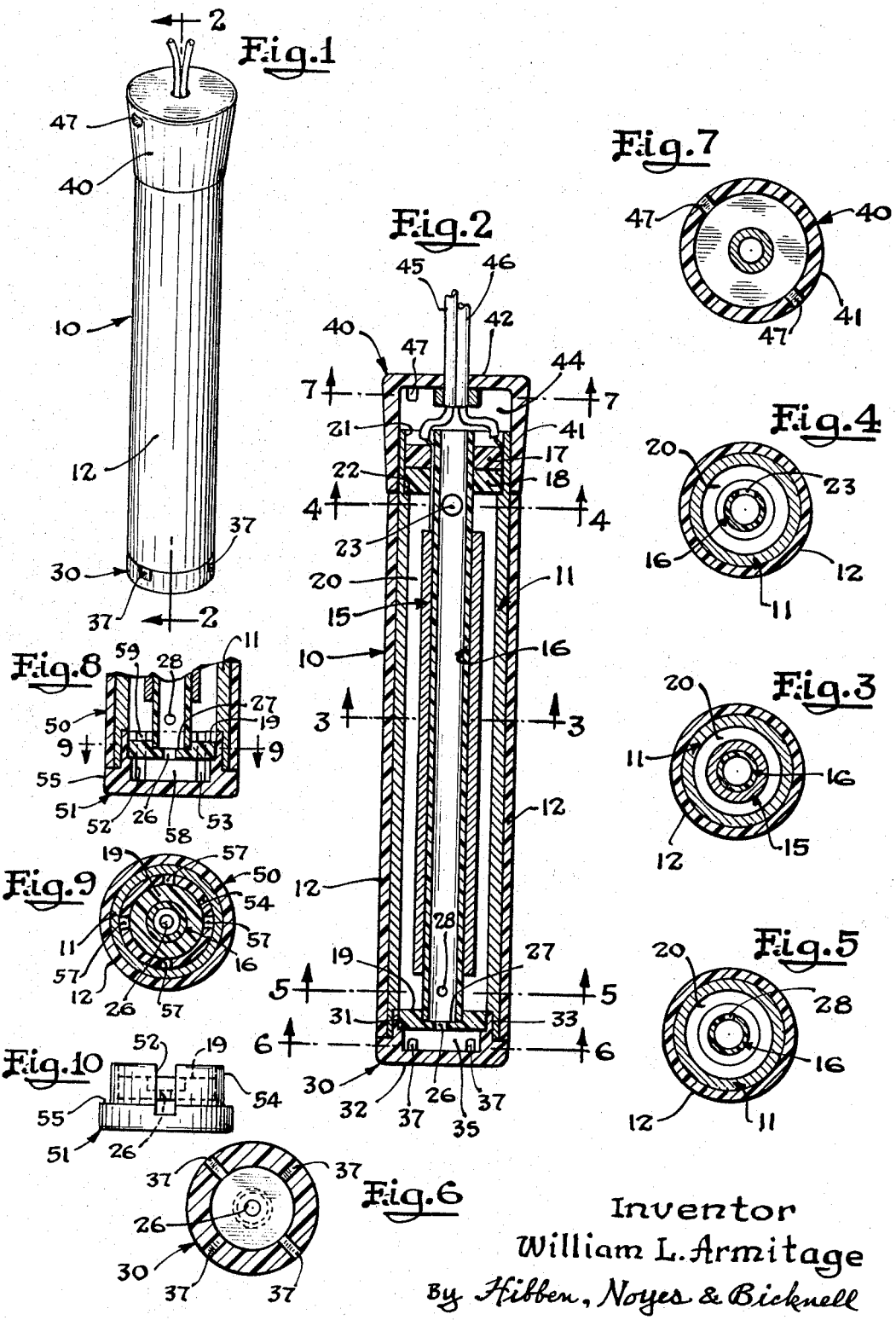

3,326,724
DEFERRED-ACTION BATTERY
William L. Armitage, Heyworth, Ill., assignor to National Union Electric Corporation, Stamford, Conn., a corporation of Delaware
Filed Aug. 21, 1964, Ser. No. 391,116
7 Claims. (Cl. 136—90)

The present invention relates generally to a deferred-action battery, and more particularly to an improved deferred-action primary cell which is adapted to be activated by immersion in a body of aqueous fluid.

Various types of apparatus are designed to be operated by a deferred-action battery. Many of these applications are for emergency or survival equipment where a high degree of reliability is essential and where the battery must be ready for instantaneous use after a prolonged period of storage by immersion of the battery in water, such as the fresh water of a lake or the salt water of an ocean.

Since the most useful type of deferred-action battery must be immediately activated when the battery cell is contacted with water without requiring adjustment or removal of parts, and since such batteries are frequently stored for prolonged periods in highly humid atmospheres before use, it will be evident that a highly desirable quality of a deferred-action battery of the instant type is the ability to withstand storage for prolonged periods in a high humidity atmosphere and be ready for instant activation without losing its effectiveness.

It is also important that delayed action batteries of the instant type operate with substantially equal life and light intensity in either fresh water or salt water in order to avoid having to provide a separate battery for each type of use. And, it is important, particularly in personnel survival equipment, that the battery be capable of being moved about in the water, as when being carried by a swimmer, without interfering with the performance of the battery.

It is therefore an object of the present invention to provide an improved deferred-action battery of the instant type which can be stored ready for immediate use for a prolonged period in a high humidity atmosphere without markedly reducing the effectiveness of the battery.

It is a further object of the present invention to provide an improved deferred-action battery adapted to operation in both fresh water and salt water and with equal life and light intensity.

It is still another object of the present invention to provide an improved deferred-action battery of the instant type which can be moved about freely while immersed in water without interfering with the performance of the battery.

Other objects of the present invention will be evident to those skilled in the art from the following detailed description and claims when read in conjunction with the accompanying drawing, wherein:

FIG. 1 is a side elevational view of one embodiment of the present invention;

FIG. 2 is a vertical sectional view taken along the line 2—2 of FIG. 1;

FIG. 3 is a horizontal sectional view taken along the line 3—3 of FIG. 2;

FIG. 4 is a horizontal sectional view taken along the line 4—4 of FIG. 2;

FIG. 5 is a horizontal sectional view taken along the line 5—5 of FIG. 2;

FIG. 6 is a horizontal sectional view taken along the line 6—6 of FIG. 2;

FIG. 7 is a horizontal sectional view taken along the line 7—7 of FIG. 2;

FIG. 8 is a fragmentary vertical sectional view of a modified form of the present invention;

FIG. 9 is a horizontal sectional view taken along the line 9—9 of FIG. 8; and

FIG. 10 is a side elevational view of a portion of the assembly shown in FIG. 8.

The battery structure 10 of FIGS. 1–7 of the drawing illustrating one embodiment of the present invention is comprised of an outer tubular section 11 of magnesium metal which forms the anode or negative electrode of the battery and comprises the main body section of the battery structure 10. As best shown in FIG. 3 of the drawing, the tubular section 11 in the preferred embodiment is circular in cross-section. A protective outer covering or sleeve 12 of extruded plastic is formed over the outer surface of the outer electrode and provides a surface on which any required marking can be printed. The plastic sleeve 12 is preferably comprised of a vinyl-polyethylene polymer which meets the Underwriters Laboratory specification for continuous duty at a temperature of 105° C. The silver chloride tube 15 comprising the cathode or positive electrode is supported in spaced relationship with said tubular section 11 concentrically within the anode tubular section 11 by a tubular core member 16 which in the preferred form is made of a non-conducting plastic and which is substantially longer than the inner silver chloride tube 15 but shorter than the outer electrode tubular section 11. The ends of the tube 15 are disposed axially inwardly of the ends of the tubular section 11. The plastic tubular core member 16 is accurately held in a predetermined position within the tubular section 11 by having the upper end of the plastic core member 16 engaged by preferably non-conductive plastic upper spacer discs 17, 18, and the lower end of the core member 16 being engaged by a preferably non-conductive plastic lower spacer disc 19 which is supported within a lower non-conductive plastic end cap 30 so that the cathodic silver chloride tube 15 fixedly mounted intermediate the ends of the core member 16 is maintained a predetermined distance from the inner wall surface of the anode tubular section 11 to form an annular space 20 between the electrodes. The upper spacer discs 17, 18 have axial openings therein to receive the end of the tubular core member 16 and are fixedly secured to each other and to the tubular core member 16 at points spaced inwardly from the upper end thereof. The lateral surfaces of the discs 17, 18 engage an inner enlarged diameter cylindrical surface 21 formed in the upper end section of the magnesium anode tubular section 11. A shoulder 22 formed on the inner surface of the tubular section 11 engages the lower surface of spacer disc 18. The core member 16 is disposed within the section 11 so that the upper end surfaces of the tubular section 11 and the core member 16 are preferably in the same transverse plane. Immediately below the spacer disc 18 and above the upper end of the tube 15 one transverse passage 23 is formed in the lateral wall of the tubular core member 16. The upper spacer discs 17, 18 and the lower spacer disc 19 close off the annular space 20 between the electrodes from direct communication with liquid in which the battery is immersed. If desired, the spacer discs 17, 18 can be made integrally in the form of an end plug which has an axial passage to receive the core member 16 and which fits into the bore of the tubular section 11. The latter end plug can be provided with a flange which engages the end of the tubular section 11 and eliminates the need for counterboring the tubular section 11.

The lower spacer disc 19 which is mounted in the end cap 30 is provided with a small axial passage or orifice 26 and has formed in the upper surface thereof an axial recess 27 to receive the end of the tubular core member 16. Immediately above the level of the spacer disc 19 at least one small passage or core opening 28 extends transversely through the lateral wall of the tubular core member 16 to provide a fluid passage between the axial passage of the core member 16 and the annular space between the electrodes. The orifice 26 and core opening 28 are preferably equal in diameter (i.e. .062 inch) and have a substantially smaller diameter than passage 23 (i.e. .125 inch) at the upper end of core member 16. The lower disc 19 is seated in an enlarged diameter cylindrical axial recess 31 formed in the upper end of the cap 30 so that the disc 19 is supported axially therein spaced from the lower end wall 32 of the cap 30 and forms a chamber 35 between the disc 19 and the end wall 32 of the cap 30. The cylindrical wall section 33 of the end cap 30 is adapted to be seated in an enlarged diameter axial recess formed in the lower end of the tubular section 11. In order to avoid counterboring a recess in the cylindrical wall section 33 and the cap 30, it is possible to form the lower spacer disc so that it can be inserted directly into the end of the tubular section 11 forming a frictional engagement therewith and forming the cylindrical wall section 33 so that it frictionally engages the inner wall of the tubular section 11 and the lower surface of the lower spacer disc. A flange 34 extends laterally from the end wall 32 of the cap 30 and engages the lower end surface of the tubular section 11. A plurality of circumferential uniformly spaced passages 37, preferably four in number, and having a diameter of about .062 inch, extend transversely through the flange 34 and provide fluid passages into the interior of chamber 35. The chamber 35 communicates with the annular passage between the spaced electrodes by means of the orifice 26 and the core passage 28.

The upper end of the tubular section 11 and the open end of the tubular core member 16 are enclosed by an upper cylindrical cap member 40 having a cylindrical lateral wall section 41 which is adapted to fit over the outer end of the tubular section 11 and engage the end of the outer plastic sleeve 12. The upper end wall 42 of the cap member 40 is preferably spaced well above the upper end of the tubular section 11 forming a chamber 44 between the end wall 42 and the disc 17. The chamber 44 communicates with the annular space between the electrodes through the axial passage of the core member 16 and the transverse passages 23 extending through the wall of the core member 16. A plurality of circumferentially spaced passages 47, preferably two, are formed in the lateral wall section 41 of the cap member 40 at points spaced slightly below the end wall 42 through which gases and by-products escape from the chamber 44, as will be described hereinafter. The wire conductors 45, 46 which are electrically connected to the magnesium anode or tubular section 11 and to the silver chloride cathode or tube 15, respectively, extend outwardly through the end wall 42 of the cap member 40.

In the modified form of the invention shown in FIGS. 8, 9, and 10, the lower end assembly of the battery 50 is modified slightly to provide one or more, and preferably four, restricted passages directly from the lower chamber 35 into the annular space 20 between the electrodes. Thus, the lower end cap 51 is provided with two sets of oppositely disposed slots 52, 53, respectively, cut in the cylindrical wall section 54 and extending partially into the flange 55 thereof. Also, the cylindrical wall section 54 is preferably counterbored so that the upper surface of the core member centering disc 19 seated therein in assembled position is disposed below the upper end of the cylindrical wall section 54 to avoid having the disc 19 contacting the tubular section 11. As best shown in FIG. 9, the latter assembly provides a plurality of restricted passages 57 between the tubular section 11 and the cylindrical wall section 54 which permit heavy fluids and sediment formed during the electrochemical reaction to fall downwardly from the electrodes into the chamber 58 where these heavy waste products can be readily washed from the battery through the passages 59 formed between the end of the sleeve 12 and the slots 52, 53, respectively. If desired, the lower spacer disc need not be received within the slotted end cap 51 or the cap 51 seated in a counterbore in the tubular section 11 by providing a spacer disc with cutout portions opposite the slots 52, 53, in the end cap and frictionally seating both the spacer disc and the end cap directly in the bore of the tubular section 11.

It will be evident from the foregoing description and accompanying drawing that the batteries made in accordance with the present invention are made with a plurality of restricted fluid flow passages and baffle means which are designed to positively restrict and control the flow of fluid between the plates or electrodes during the operation of the battery and while the battery is stored. The normal flow of water or other aqueous activating fluid into the battery, as illustrated in FIGS. 1–7, is through the four passages 37 in the lower end cap into a chamber 35, up through an orifice 26, then through the core member 16 and the core passage 28 into the annular space between the two electrodes of the battery. The water along with the reaction product salts form the electrolyte between the electrodes and complete the electrochemical system required for activating the battery. While the battery is being activated and while operating, the air within the deactivated battery and the small amount of gas and other reaction products formed therein normally rise to the top of the battery, pass through the lateral passage 23 in the plastic core member 16, enter the chamber 44 of the plastic cap member 40, and pass outwardly into the surrounding body of water through the passages 47 in the cap member 40. The passages 23 and 28 assist in drawing out any accumulation of reaction products from between the electrodes when the battery is operating, but prevent withdrawing all of the internally generated salts which serve to improve the electrolyte when the battery is used in fresh water, thereby making it possible to operate the battery 10 effectively in fresh water as well as salt water. It will be evident that when the battery 10 is moved through water, the main flow passage in the battery for the water is through the axial passage in the core member 16 and that water must pass circuitously around several corners and through several passages before entering or leaving the annular space between the electrodes. The battery unit is thus especially designed to allow movement thereof through either fresh or salt water without unduly agitating or flushing the conductive electrolyte from between the electrodes and thereby avoids rapidly changing the concentration of the electrolyte in the annular space between the electrodes. Thus, it is possible for the battery of the present invention to maintain the maximum amount of output at a substantially uniform level at all times regardless of the conditions under which the battery is operated. The special design of the battery also makes it possible for the battery to pass the 100-hour salt spray and 30-day humidity tests without use of sleeves or plugs to cover the openings 37 and 47 in the end caps. For example, the axial core member provides a passage for air to circulate in the cell and prevent condensation of moisture during storage.

When an electric current is no longer required, the battery 10 can be temporarily deactivated by withdrawing the battery from the activating water. With the battery held vertically, the water in the battery flows downwardly and out through the passages 37 to effect deactivation. By having the electrodes spaced about 1/16 inch in the preferred form, there is little tendency for water drops to "hold up" or bridge between the electrodes. Also, by having the lower end of the silver chloride tube 15 well above the end of the magnesium tubular section 11, the water drains down to the lower level of the core passage 28, allowing in the preferred form illustrated approximately a 3/16 inch space between the bottom of the silver chloride tube 15 and the water level, thereby insuring complete deactivation of the battery.

The flow of fluids within the battery shown in FIGS. 8, 9, and 10 is substantially the same as in the battery of FIGS. 1–7, except that during activation and deactivation thereof a part of the liquid can pass through the passages 57, as well as through core opening 28. During operation of the battery, however, there is no significant flushing of the electrolyte from the annular passage 20 through the passages 57, presumably because of the reduced size of the passages 57 and because all of the turbulence is restricted to the chamber 35.

While in the preferred embodiment of the present invention the magnesium tubular member is the outer electrode, it is possible to reverse the electrodes and make the inner electrode of magnesium and have the silver chloride as the outer electrode. Also, other combinations of metals or compositions can be used to provide the electrochemical reaction which will produce the required electrical energy during the discharge of the battery, as those skilled in the art will readily understand. And, if desired, the core member can also be made out of a conductive material which does not take part in the electrochemical reaction. It should also be evident that the tubular elements of the battery need not be circular in cross-section, but can have any desired tubular form and still function in the herein described manner.

Others may practice the invention in any of the numerous ways which are suggested to one skilled in the art by this disclosure, and all such practice of invention are considered to be a part hereof which fall within the scope of the appended claims.

I claim:

1. A deferred-action battery adapted for activation by immersion in a body of aqueous liquid electrolyte and deactivation on withdrawal from said liquid electrolyte; comprising an outer tubular electrode and an inner tubular electrode disposed in spaced co-axial relationship within said outer electrode, said electrodes having therebetween an unobstructed annular liquid electrolyte passageway extending substantially the length of said electrodes and adapted to receive aqueous liquid electrolyte in axial flow therein when said battery is activated by immersion in a body of said aqueous liquid electrolyte, an axially disposed tubular core means having an axial passage extending substantially the length of said electrode supportively associated with said inner electrode, said core means having adjacent the opposite ends thereof a passage therein connecting said axial passage thereof with said annular passageway upper and lower non-conductive spacer means which are adapted to maintain said electrodes in spaced relationship, said spacer means closing the opposite ends of said annular passage, upper and lower cap members closing the opposite ends of said outer electrode to form a fluid chamber at each end of said battery which is in fluid communication with said axial passage of said core means, and upper and lower passage means extending through a wall of said cap members communicating with said chambers, and an electrically isolated conductor means connected with each of said electrodes extending outwardly from said electrodes.

2. A deferred-action battery adapted for activation by immersion in a body of aqueous liquid electrolyte and deactivation on withdrawal from said liquid electrolyte; comprising an outer tubular electrode and an inner tubular electrode disposed in spaced co-axial relationship within said outer electrode, said electrodes having therebetween an unobstructed annular liquid electrolyte passageway extending substantially the length of said electrodes and adapted to receive aqueous liquid electrolyte in axial flow therein when said battery is activated by immersion in a body of said aqueous liquid electrolyte, an axially disposed tubular core means having an axial passage extending substantially the length of said electrode associated with said inner electrode, said core means having adjacent the opposite ends thereof a passage therein connecting said axial passage thereof with said annular passageway upper and lower non-conductive spacer means which are adapted to maintain said electrodes in spaced relationship, said core means having upper lower transverse passages adjacent the opposite ends thereof extending through the lateral wall thereof and spaced axially inwardly of said spacer means to provide unobstructed fluid passages between said tubular core means and said passageway, upper and lower cap members closing the opposite ends of said outer electrode and defining with said spacer means upper and lower fluid chambers and said fluid chambers being in fluid-flow communication with said annular liquid passageway through said tubular core means and one of said transverse passages in said core means, said lower spacer means having a passage formed therein to permit the flow of said electrolyte from said lower fluid chamber into said tubular core means, and each of said cap members having at least one passage through a wall section thereof to permit passage of said electrolyte into and out of the said chamber associated therewith when the battery is immersed in said electrolyte, and an electrically isolated conductor means connected with each of said electrodes extending outwardly from said electrodes.

3. A deferred-action battery adapted for activation by immersion in a body of aqueous liquid electrolyte and deactivation on withdrawal from said liquid electrolyte; comprising an outer tubular electrode and an inner tubular electrode disposed in spaced co-axial relationship within said outer electrode, said electrodes having therebetween an unobstructed annular fluid liquid electrolyte passageway extending substantially the length of said electrodes and adapted to receive aqueous liquid electrolyte in axial flow therein when said battery is activated by immersion in a body of said aqueous liquid electrolyte, an axially disposed tubular core means having an axial passage extending substantially the length of said electrode associated with said inner electrode, said core means having adjacent the opposite ends thereof a passage therein connecting said axial passage thereof with said annular passageway upper and lower non-conductive spacer means which are adapted to maintain said electrodes in spaced relationship, said core means having upper and lower transverse passages adjacent the opposite ends thereof extending through the lateral wall thereof which are spaced axially inwardly of said spacer means to provide liquid electrolyte passages between said tubular core means and said passageway, upper and lower cap members closing the opposite ends of said outer electrode and defining with said spacer means upper and lower fluid chambers and said fluid chambers being in fluid-flow communication with said annular liquid electrolyte passageway through said tubular core means and one of said transverse passages in said core means, said lower spacer means having a passageway formed therein to permit the flow of liquid electrolyte from said lower fluid chamber into said tubular core means, a passage means associated with said lower cap member connecting said annular fluid passageway and said lower fluid chamber, and each of said cap members having at least one passage through a wall section thereof to permit passage of fluid into and out of the said chamber associated therewith when the battery is immersed in said fluid, and an electrically isolated conductor means connected with each of said electrodes extending outwardly from said electrodes.

4. A deferred-action battery adapted for activation by immersion in a body of aqueous liquid electrolyte and deactivation on withdrawal from said liquid electrolyte; comprising an outer tubular electrode and an inner tubular electrode disposed in spaced co-axial relationship within said outer electrode, said electrodes having therebetween an unobstructed annular liquid electrolyte passageway extending substantially the length of said electrodes and adapted to receive aqueous liquid electrolyte in axial flow therein when said battery is activated by immersion in a body of said aqueous liquid, an axially disposed tubular core member supporting said inner electrode intermediate the ends thereof and providing an axial passage extending substantially the length of said electrodes for the axial flow of said liquid, said core member being supported axially within said outer tubular electrode by upper and lower non-conductive spacer means, and said core member having upper and lower transverse passages adjacent the opposite ends thereof extending through the lateral wall thereof which are spaced axially inwardly of said spacer means to provide liquid electrolyte passages between said tubular core member and said passageway, upper and lower cap members closing the opposite ends of said outer electrode and defining with said spacer means upper and lower fluid chambers and said fluid chambers being in fluid-flow communication with said annular fluid passageway through said tubular core member and one of said transverse passages in said core member, said lower spacer means having a restricted axial passage formed therein to restrict the flow of liquid electrolyte from said lower fluid chamber into said tubular core member, and each of said cap member having at least one passage through a wall section thereof to permit passage of liquid electrolyte into and out of the said chamber associated therewith when the battery is immersed in said liquid electrolyte, and an electrically isolated conductor means connected with each of said electrodes extending outwardly from said electrodes.

5. A deferred-action battery adapted for activation by immersion in a body of aqueous liquid electrolyte and deactivation on withdrawal from said liquid electrolyte; comprising an outer tubular electrode and an inner tubular electrode disposed in spaced co-axial relationship within said outer electrode, said electrodes having therebetween an unobstructed annular liquid electrolyte passageway extending substantially the length of said electrodes and adapted to receive aqueous liquid electrolyte in axial flow therein when said battery is activated by immersion in a body of said aqueous liquid electrolyte, an axially disposed tubular core member having an axial passage extending substantially the length of said electrodes and which is adapted to support said inner electrode, said core member being supported axially within said outer tubular electrode by transversely extending upper and lower non-conductive spacer means which close said annular liquid electrolyte passageway to direct communication with said body of aqueous liquid electrolyte on immersion therein and providing an axial passage extending substantially the length of said electrodes for the flow of said aqueous liquid electrolyte, said core member having upper and lower transverse passages adjacent the opposite ends thereof extending through the lateral wall thereof which are spaced axially inwardly of said spacer means to accommodate the flow of said liquid electrolyte between said core member and said passageway, said lower transverse passage having a reduced diameter relative to said upper transverse passage, upper and lower cap members closing the opposite ends of said outer electrode and defining with said spacer means upper and lower fluid chambers and said fluid chambers being in fluid-flow communication with said annular liquid electrolyte passageway through said tubular core member and one of said transverse passages in said core member, said lower spacer means having a restricted axial passage formed therein to restrict the flow of liquid electrolyte from said lower fluid chamber into said tubular core member, and each of said cap members having at least one passage through a wall section thereof to permit passage of liquid electrolyte into and out of the said chamber associated therewith when the battery is immersed in said liquid electrolyte, and an electrically isolated conductor means connected with each of said electrodes extending outwardly from said electrodes.

6. A deferred-action battery adapted for activation by immersion in a body of aqueous liquid and deactivation on withdrawal from said liquid; comprising an outer tubular magnesium electrode and an inner tubular silver chloride electrode disposed in spaced co-axial relationship within said outer electrode, said electrodes having an unobstructed annular fluid passageway therebetween adapted to receive aqueous liquid therein when activating by immersion in a body of aqueous liquid, an axially disposed tubular core member supporting said inner electrode intermediate the ends thereof, said core member being supported axially within said outer tubular electrode by upper and lower non-conductive spacer means which close said annular fluid passageway to direct communication with said body of aqueous liquid on immersion therein and said core member having upper and lower transverse passages adjacent the opposite ends thereof extending through the lateral wall thereof which are spaced axially inwardly of said spacer means to provide fluid passages between said core member and said passageway, upper and lower cap members closing the opposite ends of said outer magnesium electrode and defining with said spacer means upper and lower fluid chambers and said fluid chambers being in fluid-flow communication with said annular fluid passageway through said tubular core member and one of said transverse passages in said core member, said lower spacer means having a restricted axial passage formed therein to restrict the flow of fluid from said lower fluid chamber into said tubular core member, and each of said cap members having at least one passage through a wall section thereof to permit passage of fluid into and out of the said chamber associated therewith when the battery is immersed in said fluid, and an electrically isolated conductor means connected with each of said electrodes extending outwardly from said electrodes.

7. A deferred-action battery adapted for activation by immersion in a body of aqueous liquid and deactivation on withdrawal from said liquid; comprising an outer tubular magnesium electrode and an inner tubular silver chloride electrode disposed in spaced co-axial relationship within said outer electrode, said electrodes having an unobstructed annular fluid passageway therebetween adapted to receive aqueous liquid therein when activating by immersion in a body of aqueous liquid, an axially disposed tubular core member supporting said inner electrode intermediate the ends thereof, said core member being supported axially within said outer tubular electrode by upper and lower non-conductive spacer means, and said core member having upper and lower transverse passages adjacent the opposite ends thereof extending through the lateral wall thereof which are spaced axially inwardly of said spacer means to provide fluid passages between said core member and said passageway, upper and lower cap members closing the opposite ends of said outer magnesium electrode and defining with said spacer means upper and lower fluid chambers and said fluid chambers being in fluid-flow communication with said annular fluid passageway through said tubular core member and one of said transverse passages in said core member, said lower spacer means having a restricted axial passage formed therein to restrict the flow of fluid from said lower fluid chamber into said tubular core member, a passage means associated with said lower cap member providing a direct connection between said annular fluid passageway and said lower fluid chamber, and each of said cap members having at least one passage through a wall section thereof to permit passage of fluid into and out of the said chamber associated therewith when the battery is immersed in said fluid, and an electrically isolated conductor means connected with each of said electrodes extending outwardly from said electrodes.

References Cited

UNITED STATES PATENTS 3,147,149   9/1964   Postal _____ 136—86

WINSTON A. DOUGLAS, *Primary Examiner.*

B. J. OHLENDORF, A. SKAPARS, *Assistant Examiners.*